United States Patent
Hollander et al.

(10) Patent No.: US 12,099,041 B2
(45) Date of Patent: Sep. 24, 2024

(54) AUTOMATED PARALLEL AUTOSAMPLER SYSTEM AND METHOD FOR DRAWING CHROMATOGRAPHY SAMPLES

(71) Applicant: Bristol-Myers Squibb Company, Princeton, NJ (US)

(72) Inventors: Cristopher Hollander, West Newton, MA (US); Thomas Edward McDonagh, Charlestown, MA (US)

(73) Assignee: BRISTOL-MYERS SQUIBB COMPANY, Princeton, NJ (US)

( * ) Notice: Subject to any disclaimer, the term of this patent is extended or adjusted under 35 U.S.C. 154(b) by 0 days.

(21) Appl. No.: 17/768,988

(22) PCT Filed: Nov. 19, 2020

(86) PCT No.: PCT/US2020/061210
§ 371 (c)(1),
(2) Date: Apr. 14, 2022

(87) PCT Pub. No.: WO2021/102100
PCT Pub. Date: May 27, 2021

(65) Prior Publication Data
US 2024/0102973 A1    Mar. 28, 2024

Related U.S. Application Data

(60) Provisional application No. 62/937,843, filed on Nov. 20, 2019.

(51) Int. Cl.
*G01N 1/14*     (2006.01)
*G01N 30/24*    (2006.01)
(52) U.S. Cl.
CPC .............. *G01N 30/24* (2013.01); *G01N 1/14* (2013.01)

(58) Field of Classification Search
CPC ........... G01N 30/24; G01N 1/14; G01N 30/16
(Continued)

(56) References Cited

U.S. PATENT DOCUMENTS 4,734,261 A * 3/1988 Koizumi ............... B01L 3/0217
                                                 73/864.18
4,938,080 A * 7/1990 Sarrine ............ G01N 27/44743
                                                 204/616
(Continued)

FOREIGN PATENT DOCUMENTS

CN    205797283 U  * 12/2016
CN    205868564 U  *  1/2017
(Continued)

OTHER PUBLICATIONS

Protein Maker Brochure, Protein BioSolutions, Inc., 2013.
(Continued)

*Primary Examiner* — Robert R Raevis
(74) *Attorney, Agent, or Firm* — Budzyn IP Law, LLC

(57) ABSTRACT

In one aspect, an automated, parallel autosampler system for drawing chromatography samples from a plurality of sample containers is provided which includes: a deck; a head movable relative to the deck; at least one drive selectively controllable to move the head relative to the deck; a plurality of elongated sippers mounted to the head at spaced-apart locations; a plurality of outlet tubes connected to the sippers in one-to-one correspondence; and, at least one source of negative pressure in selective communication with the outlet tubes to selectively provide negative pressure in the lumens of the sippers, wherein, the sippers are arranged on the head so that the sippers are simultaneously insertable into a corresponding number of the sample containers. Advantageously, the subject invention allows for much greater size samples to be extracted than the prior art with permitted (Continued)

variability in the number and configuration of the sample containers.

36 Claims, 3 Drawing Sheets

(58) Field of Classification Search
USPC .......... 73/23.41, 23.42, 61.55, 61.56, 61.59, 73/64.56, 863.31, 863.33, 864.21–864.25
See application file for complete search history.

(56) References Cited

U.S. PATENT DOCUMENTS

| | | | |
|---|---|---|---|
| 5,988,236 A | 11/1999 | Fawcett | |
| 7,943,393 B2* | 5/2011 | Gjerde | B82Y 30/00 |
| | | | 73/864.18 |
| 8,900,527 B2* | 12/2014 | D'Amore | G01N 35/1067 |
| | | | 73/864.11 |
| 2009/0145439 A1* | 6/2009 | Peichel | A61M 16/0488 |
| | | | 128/207.17 |
| 2013/0291660 A1* | 11/2013 | Wilmer | B01L 3/021 |
| | | | 73/864.13 |

FOREIGN PATENT DOCUMENTS

| | | | | |
|---|---|---|---|---|
| CN | 108181410 A | * | 6/2018 | ............. G01N 30/06 |
| EP | 0140247 A2 | | 5/1985 | |
| WO | 2006089103 A1 | | 8/2006 | |

OTHER PUBLICATIONS

International Search Report and Written Opinion of the International Searching Authority from PCT International Application No. PCT/US2020/061210, dated Feb. 15, 2021.

* cited by examiner

AUTOMATED PARALLEL AUTOSAMPLER SYSTEM AND METHOD FOR DRAWING CHROMATOGRAPHY SAMPLES

CROSS-REFERENCE TO RELATED APPLICATIONS

This application is a National Stage Application under 35 U.S.C. § 371 of PCT Application No. PCT/US2020/061210, filed Nov. 19, 2020, which claims the priority benefit of U.S. Provisional Application No. 62/937,843, filed Nov. 20, 2019; the contents of which are herein incorporated by reference in their entireties.

BACKGROUND

Automated parallel autosamplers are known in the prior art for drawing chromatography samples from a plurality of columns. A known system is sold under the brand "PROTEIN MAKER," by Protein BioSolutions, Inc. of Gaithersburg, MD, which utilizes a plurality of syringe pumps for drawing samples from multi-well plates. The "PROTEIN MAKER" system is only capable of extracting samples of limited size and is therefore not suitable for purifications of biological samples where each sample needs to be prepared on a medium or larger scale.

SUMMARY

In one aspect, an automated, parallel autosampler system for drawing chromatography samples from a plurality of sample containers is provided herein which includes: a deck; an array of compartments defined by the deck, each of the compartments configured to closely receive one of the sample containers in an upright manner to minimize relative movement of the received sample container relative to the deck; a head movable in three coordinate directions relative to the deck; at least one drive selectively controllable to move the head in adjusting the position of the head relative to the deck; a plurality of elongated sippers mounted to the head at spaced-apart locations, each of the sippers having a first open end, a second open end, and a lumen extending between the first and second open ends, wherein, the sippers are arranged on the head such that the first open ends face the deck; a plurality of outlet tubes connected to the second open ends of the sippers in one-to-one correspondence; and, at least one source of negative pressure in selective communication with the outlet tubes to selectively provide negative pressure in the lumens of the sippers, wherein, the sippers are arranged on the head so that the first open ends of the sippers are simultaneously insertable, with movement of the head, into a corresponding number of the sample containers. Advantageously, the subject invention allows for much greater size samples to be extracted than the prior art with permitted variability in the number and configuration of the sample containers.

In a further aspect, an automated, parallel autosampler system for drawing chromatography samples from a plurality of sample containers is provided herein which includes: a deck; an array of compartments defined by the deck, each of the compartments configured to closely receive one of the sample containers in an upright manner to minimize relative movement of the received sample container relative to the deck; a head; at least one drive selectively controllable to move the deck in three coordinate directions relative to the head; a plurality of elongated sippers mounted to the head at spaced-apart locations, each of the sippers having a first open end, a second open end, and a lumen extending between the first and second open ends, wherein, the sippers are arranged on the head such that the first open ends face the deck; a plurality of outlet tubes connected to the second open ends of the sippers in one-to-one correspondence; and, at least one source of negative pressure in selective communication with the outlet tubes to selectively provide negative pressure in the lumens of the sippers, wherein, the sippers are arranged on the head so that the first open ends of the sippers are simultaneously insertable, with movement of the deck, into a corresponding number of the sample containers.

In yet a further aspect, an automated, parallel autosampler system for drawing chromatography samples from a plurality of sample containers is provided herein which includes: a deck; an array of compartments defined by the deck, each of the compartments configured to closely receive one of the sample containers in an upright manner to minimize relative movement of the received sample container relative to the deck; a head; at least one first drive selectively controllable to move the deck in at least one coordinate direction relative to the head; at least one second drive selectively controllable to move the head in at least one coordinate direction relative to the deck; a plurality of elongated sippers mounted to the head at spaced-apart locations, each of the sippers having a first open end, a second open end, and a lumen extending between the first and second open ends, wherein, the sippers are arranged on the head such that the first open ends face the deck; a plurality of outlet tubes connected to the second open ends of the sippers in one-to-one correspondence; and, at least one source of negative pressure in selective communication with the outlet tubes to selectively provide negative pressure in the lumens of the sippers, wherein, the sippers are arranged on the head so that the first open ends of the sippers are simultaneously insertable, with movement of at least one of the head and the deck, into a corresponding number of the sample containers.

In still a further aspect, a method for drawing chromatography samples from a plurality of sample containers is provided herein which includes: emplacing a plurality of sample containers in an array of compartments defined by a deck; positionally adjusting at least one of a head and the deck such that a plurality of sippers mounted to the head are simultaneously in vertical alignment with a corresponding number of the sample containers; and, positionally adjusting at least one of the head and the deck to allow the sippers to be simultaneously inserted into the corresponding number of the sample containers.

These and other features of the subject disclosure will be better understood through a study of the following detailed description and accompanying drawings.

DETAILED DESCRIPTION OF THE INVENTION

Figure 1:
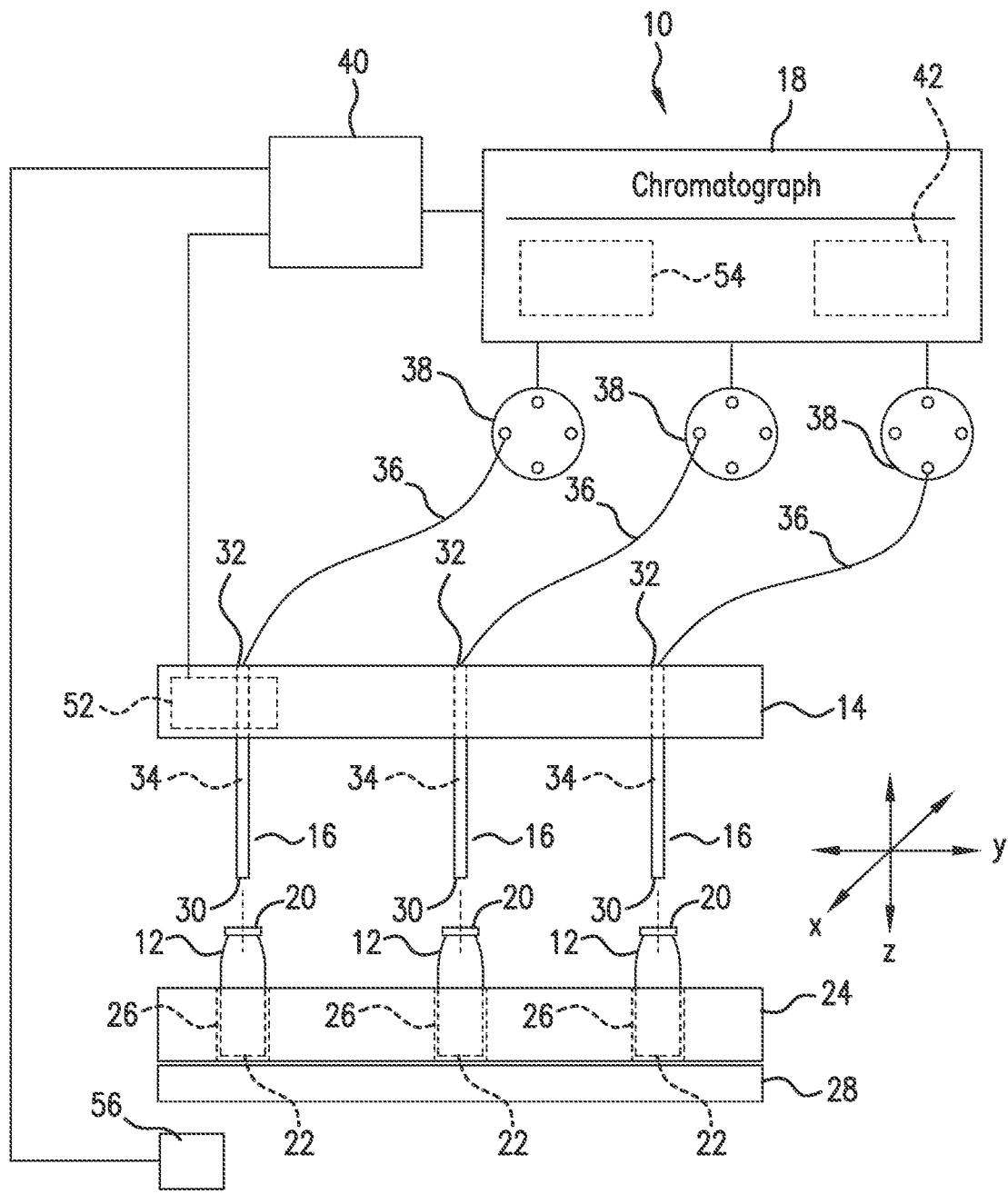
FIG. 1 is a schematic of a system formed in accordance with an embodiment of the subject invention.
Figure 2:
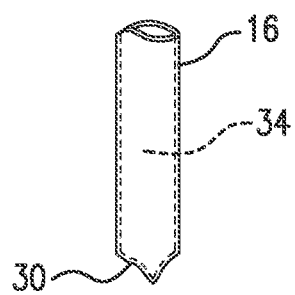
FIG. 2 shows a V-shaped end on a sipper in accordance with an embodiment of the subject invention.
Figure 3:
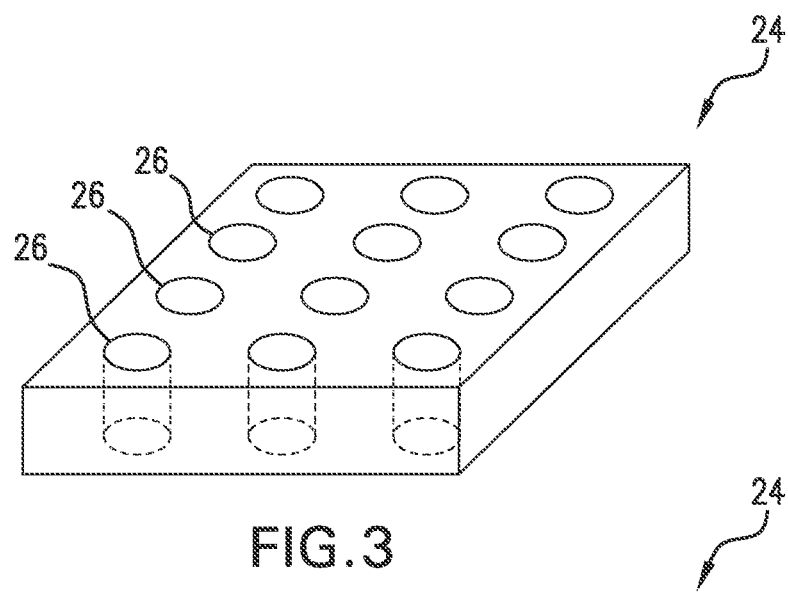
FIGS. 3 and 4 show decks useable with an embodiment of the subject invention.

With reference to FIGS. 1-3, a system 10 is shown for drawing chromatography samples from a plurality of sample containers 12 in an automated and parallel manner. The system 10 includes a head 14 having a plurality of sippers 16 mounted thereto. The sippers 16 are simultaneously insertable into a corresponding plurality of the sample containers 12 to draw samples therefrom for a chromatography apparatus 18. In some embodiments, system 10 includes 3, 4, 5, 6, 7, 8, 9, 10, 11, or 12 sippers 16.

The sample containers 12 may be in the form of bottles, jars, cups, columns, tubes, flasks, wells, and so forth. The sample containers 12 may be each formed to accommodate a sample volume in the range of 10 milliliters to 10 liters, for example, from 50 to 1,000 milliliters, or from 125 to 500 milliliters. The sample containers 12 are formed of materials compatible with the samples contained therein. The sample containers 12 may be composed of polymeric material, such as polycarbonate plastic. In addition, the sample containers 12 each may have a relatively wide opening 20, for example, in the range of 0.5 to 20 inches. Further, each of the sample containers 12 may be configured to be free-standing, particularly in a stable manner, with a relatively flat bottom 22. Alternatively, the bottoms 22 of one or more of the sample containers 12 may be configured with an internal depression or well to allow for gravitational, low-point collection of the samples. This allows for more complete extraction of the samples from the sample containers. In addition, one or more of the sample containers 12 may be formed to have a tapered or conical shape, as least for the lower portion thereof extending to the bottom 22. The sample containers 12 may be each generally elongated having the bottom 22 at one end and the opening 20, at the opposite end. The sample containers 12 may be each configured such that, with resting on the bottom 22, the opening 20 is generally upward facing. By way of non-limiting example, the sample containers may be 0.5 liter, wide-mouth NALGENE® brand (polycarbonate) bottles, sold by Thermo Fisher Scientific Inc.

The openings 20 of the sample containers 12 may be open. Alternatively, a pierceable closure, which may be re-sealable, may be provided with one or more of the containers 12 to seal the openings 20. The closures may be gas transmissive yet configured to prevent passage of microbes therethrough.

The system 10 further includes a deck 24. The deck 24 defines an array of compartments 26 each configured to closely receive one of the sample containers 12 in an upright manner, such that the openings 20 of the sample containers 12 are generally facing upwardly. The sample containers 12 are closely received by the compartments 26 to minimize relative movement of the sample containers 12 relative to the deck 24. As discussed below, autosampling by the system 10 requires locating the sippers 16 relative to the sample containers 12. Reliable positioning of the sample containers 12 is needed to facilitate this functionality. Thus, to minimize movement of the sample containers 12 relative to the deck 24, the compartments 26 may be provided with sufficient depth to restrict tipping of the sample containers 12 and to restrict transverse movement of the bottoms 22 relative to the deck 24. The compartments 26 may be each formed with a depth in the range of 0.05 to 20 inches and a diameter in the range of 0.05 to 20 inches.

The deck 24 may be provided as a layer of polymeric material, such as a polymeric foam (e.g. closed cell or open cell polymeric foam) or polyvinyl chloride (PVC). Other rigid materials such as metal are also contemplated for the deck 24. The compartments 26 may be formed as openings extending completely through the deck 24. The deck 24 may be self-supporting or supported by a support plate 28. The support plate 28 may define a resting surface for the bottoms 22 of the sample containers 12. The deck 24 may have a degree of compliance to resiliently collapse with insertion of the sample containers 12 into the compartments 26.

As will be appreciated by those skilled in the art, the deck 24 may be formed in various manners, including, but not limited to, being a solid plate having the compartments 26 machined therein, or formed by multiple layers of the same or various materials. Alternatively, the deck 24 may be formed of multiple layers of various materials, thereby, possibly providing different material characteristics to the deck 24 (for example, utilizing layers of foam for compliance, and rigid plastic for support). In some embodiments, the deck 24 is substantially hollow.

The compartments 26 may be arranged in various arrays, including in a regular column and row pattern, e.g., in a 3×4 array as shown in FIG. 3. It is contemplated that a quantity of the compartments 26 will be provided greater than the quantity of the sippers 16, allowing for multiple flights of sampling once set up. In this manner, only a subset of the sample containers 12 will be sampled at a given cycle. Multiple cycles could then be completed without need for replacing sample containers. The array of the sample containers 12 may be configured based on container-to-container spacing and/or container geometry of the sample containers 12 to ensure sufficient spacing between the sample containers 12 to avoid contact (internal or external) with the sample containers 12. The array may also accommodate additional containers, such as containers for containing buffer solution, rinse solution, and so forth. The array may include a regular or irregular pattern.

Figure 4:
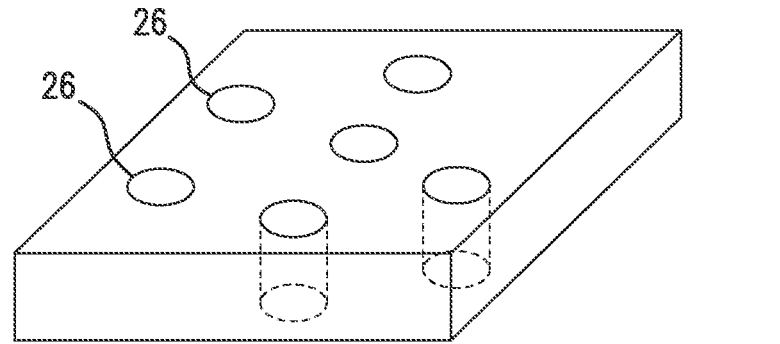

As will be appreciated by those skilled in the art, the deck 24 allows for variability in the size, configuration, and arrangement of the sample containers 12 for sampling. The system 10 may include a plurality of differently-configured decks 24 to allow for different configurations of the sample containers 12 for different testing arrangements. Preferably, the deck 24 is removable from the support plate 28 to allow for use of various decks 24. Providing the deck 24 in polymeric material, particularly as a polymeric foam, allows for users to readily prepare customized versions of the deck 24. For example, the deck 24, as shown in FIG. 3, may be utilized (FIG. 1), and replaced with the deck 24 configured with a 2×3×1 array, as shown in FIG. 4.

The sippers 16 are each elongated tubes having spaced-apart first and second open ends 30, 32, and a lumen 34 extending therebetween. The sippers 16 are mounted to the head 14 at spaced-apart locations. The sippers 16 have the first open ends 30 face the deck 24. The sippers 16 may be composed of a metallic material, such as stainless steel. As shown in FIG. 2, the sippers 16 may terminate with a V-shape about the first open ends 30 to allow for heightened end openings to maximize withdrawal of samples from the sample containers 12. Alternatively, one or more of the sippers 16 may terminate with a tapered, conical or flat shape about the first open ends 30. Optionally, one or more side ports may be included in one or more of the sippers 16, in proximity to the first open ends 30, in communication with the lumens 34 of the sippers 16. The side ports may assist in sample extraction.

Outlet tubes 36 are connected to the second open ends 32 in one-to-one correspondence. The outlet tubes 36 may be flexible tubing which is pliable to avoid kinking or other distortion with movement of the head 14. The outlet tubes 36 are connected directly or indirectly to the chromatography apparatus 18. To allow for selective control over flow through the outlet tubes 36, the outlet tubes 36 may be connected to multiport valves 38 (e.g., selector valves) having various connections to elements of the chromatography apparatus 18, and outside elements, e.g., a waste collector. A controller 40 may be provided to control sample extraction.

One or more sources of negative pressure (i.e., one or more sources of vacuum) 42 may be provided, e.g., with the chromatography apparatus 18, to selectively apply negative pressure to each of the lumens 34 of the sippers 16 via the outlet tubes 36. The sources of negative pressure 42 may be controlled by the controller 40.

Figure 5:
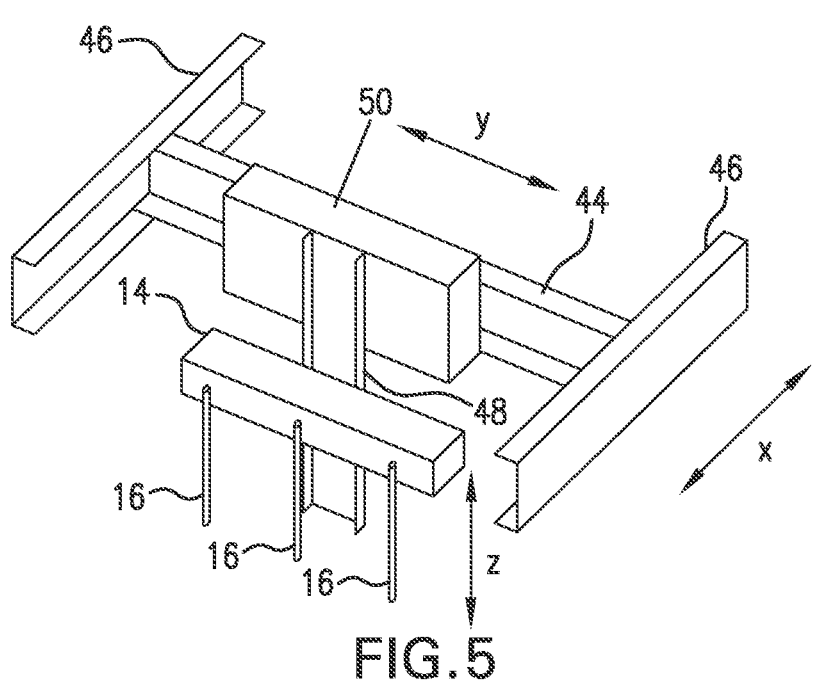
FIG. 5 shows an arrangement of rails useable for moving the head in accordance with an embodiment of the subject invention.

The head 14 may be movable in at least one coordinate direction relative to the deck 24. Optionally, the head 14 may be movable in three coordinate directions relative to the deck 24. With reference to FIG. 5, the head 14 may be mounted on coacting rails to permit multiaxial movement. By way of non-limiting example, the head 14 may be translatable along a first rail 44, which permits movement along a y-axis. The first rail 44 may, in turn, be mounted to at least one secondary rail 46, which permits translation along the at least one secondary rail 46, to permit movement along an x-axis. A tertiary rail 48 may be provided along which the head 14 may translate in a direction transverse to the first rail 44, which permits movement along a z-axis. In one embodiment, the head 14 is mounted to the tertiary rail 48, which, in turn, is mounted to a carriage 50 that is mounted to the first rail 44 for translation therealong. Any known configuration of translatable movement may be utilized, included, but not limited to, rollers captured in straight channels defined along the rails 44, 46, 48 for rolling movement therealong, screw mounted for translation therealong, chain drive, and so forth.

One or more drives 52 may be provided for selectively controlling the movement of the head 14. The drives 52 may be provided to control single-axis movement, such as stepper motors to control single axis translation along one of the rails 44, 46, 48. The drives 52 may be controlled by the controller 40.

In use, the sample containers 12, containing samples, are arranged on the deck 24 in the pre-defined array. The locations of the sample containers 12 are known and programmed into the controller 40, based on the array. The sippers 16 may be adjusted on the head 14 to have sufficient spacing to allow for parallel insertion into a corresponding quantity of the sample containers 12, with or without contact therewith. The sippers 16 are positionally adjusted with movement of the head 14, as controlled by the controller 40, first to vertically align the sippers 16 with the target sample containers 12 (to avoid external or internal contact therewith), and, then, to lower the head 14 to insert simultaneously the sippers 16 into the target sample containers 12. With application of negative pressure in the lumens 34 by the one or more sources of negative pressure 42, samples may be extracted from the sample containers 12 and drawn into the chromatography apparatus 18, via the sippers 16 and the outlet tubes 36.

With the openings 20 of the sample containers 12 being open, the sippers 16 may be inserted unhindered by any obstructions. If the openings 20 are sealed, the sippers 16 may be provided with sufficient force to breach the seals and access the contents of the sample containers 12. Optionally, the sippers 12 may be configured to have the first ends 30 closed with a sharpened or blunted tip to assist in breaching a seal, with side ports being provided in the sippers 12 to extract the samples.

Once a set of samples has been extracted, the head 14 may be positionally adjusted to allow the sippers 16 to be dipped into containers of cleaning solution. In addition, or alternatively, a rinsing solution may be caused to be pumped, under positive pressure, through the outlet tubes 36, and through the lumens 34, to be dispensed from the sippers 16 into waste containers, which may be located in the array of the deck 24. One or more pumps 54 may be provided in the system 10, e.g., on the chromatography apparatus 18, for pumping of the rinsing solution. Buffer solution may be also extracted from buffer solution containers provided in the array of the deck 24.

The system 10 may be configured to perform several parallel autosamplings, extracting from different subsets of the sample containers 12. The sequence of the autosampling may be determined by the user, with locations of the sample containers 12 on the deck 24 being defined in programming.

Figure 6:
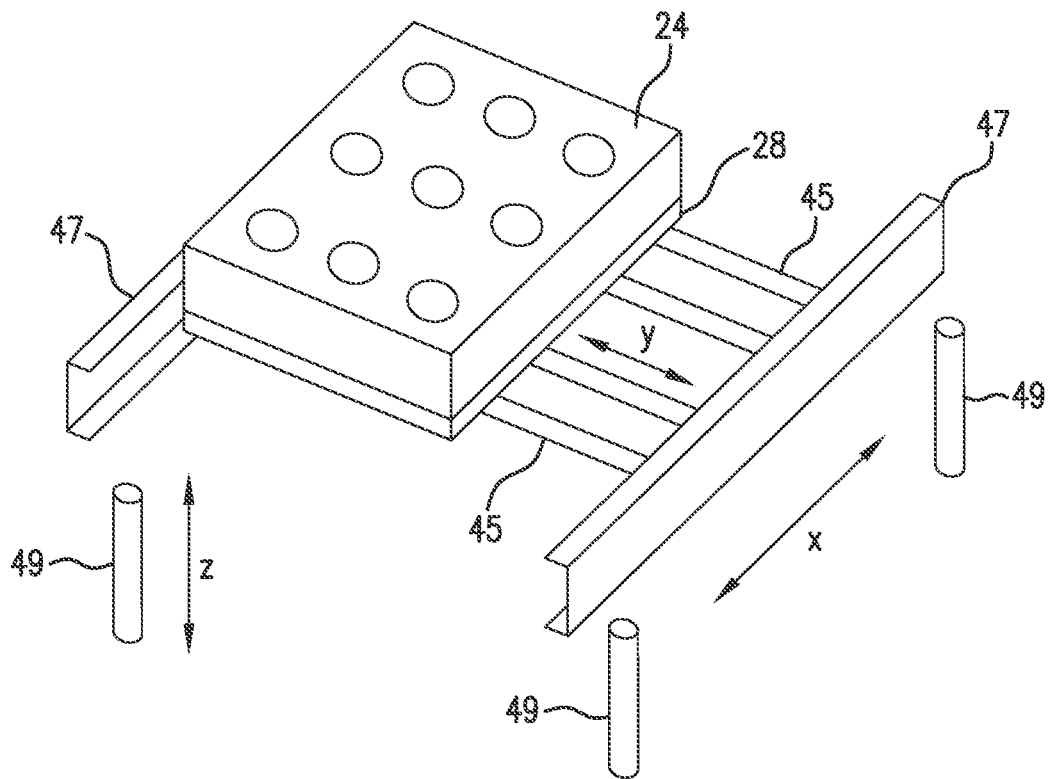
FIG. 6 shows an arrangement useable for moving the deck in accordance with an embodiment of the subject invention; and, FIG. 7 shows an arrangement useable for relative movement between the sippers in accordance with an embodiment of the subject invention.

As will be appreciated by those skilled in the art, the deck 24 may be configured to move in at least one coordinate direction, possibly up to three coordinate directions. With this arrangement, the head 14 may be stationary or provided with limited movement, e.g., within one or two coordinate directions. As shown in FIG. 6, one or more secondary drives 56, such as stepper motors, may be provided to selectively control movement of the deck 24. The deck 24 may be rail mounted, e.g. rails 45, 47 to allow for movement in one or two axes (x, y) within a plane parallel to the deck 24. In addition, a lift mechanism 49 may be provided to lift the deck 24 to provide vertical movement (z axis movement). The secondary drives 56 may be utilized to control each of these coordinate movements, with the secondary drives 56 being centrally controlled by the controller 40. The deck 24 may be moved to allow for vertical alignment of the sippers 16 with the sample containers 12 and/or to allow for insertion of the sippers 16 into the sample containers 12. Movement of one or both of the head 14 and/or the deck 24 may be utilized to achieve the necessary alignment and insertion.

Figure 7:
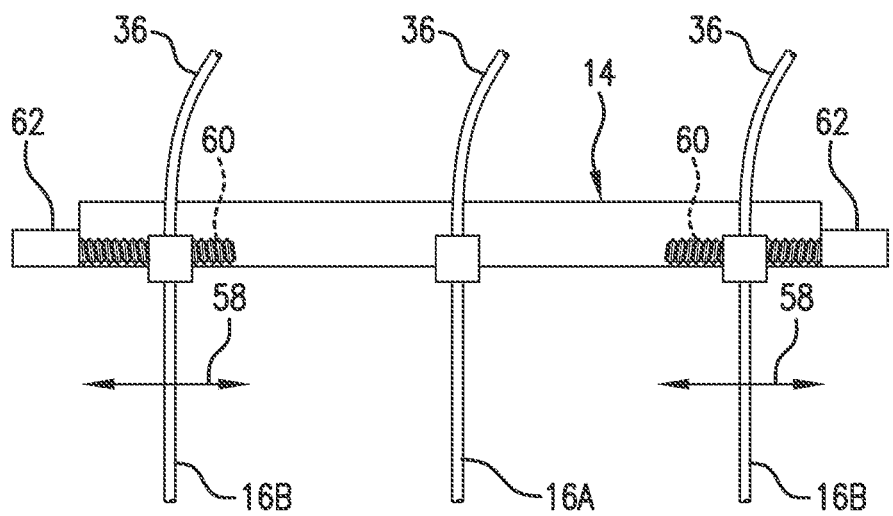

As shown in FIG. 7 by arrow 58, one or more of the sippers 16 may be fixed to a movable mount on the head 14 configured to move relative to the head 14. This allows for positional adjustment of one or more of the sippers 16 on the head 14, particularly to adjust the spacing between adjacent sippers 16. In this manner, spacing between the sippers 16 may be adjusted using automation, rather than by manual means. As shown in FIG. 7, in one configuration, outer sippers 16B may be positionally adjustable, with central sipper 16A being stationary. Each of the movable mounts may be mounted to a driven screw 60 the head 14, which is rotated by a tertiary drive 62, such as stepper motors, to allow for positional adjustment. Optionally, the central sipper 16B may be also configured to be positionally adjustable.

The controller 40 may be any computing processing unit which includes a non-transitory memory for storing instructions, particularly to carry out the processes described herein. The controller 40 may be in wired or wireless communication with the components herein. The controller 40 may be controlled via a secondary computer, e.g., linked through the Internet, a wide area network (WAN), or a local area network (LAN). A connection with a secondary computer allows for remote monitoring of the autosampling. Data may be collected and stored, e.g., start and finish times, by the secondary computer and/or cloud storage, to allow multi-point access. Sensors may be provided in the system 10 to evaluate successful completion, such as pressure sensors to determine the beginning and end of autosampling, rinsing, cleaning, and so forth.

What is claimed is:

1. An automated, parallel autosampler system for drawing chromatography samples from a plurality of sample containers, the system comprising:
   a deck;
   an array of compartments defined by the deck, each of the compartments configured to closely receive one of the sample containers in an upright manner to minimize relative movement of the received sample container relative to the deck;
   a head movable in three coordinate directions relative to the deck;
   at least one drive selectively controllable to move the head in adjusting the position of the head relative to the deck;
   a plurality of elongated sippers mounted to the head at spaced-apart locations, each of the sippers having a first open end, a second open end, and a lumen extending between the first and second open ends, wherein, the sippers are arranged on the head such that the first open ends face the deck;
   a plurality of outlet tubes connected to the second open ends of the sippers in one-to-one correspondence; and,
   at least one source of negative pressure in selective communication with the outlet tubes to selectively provide negative pressure in the lumens of the sippers,
   wherein, the sippers are arranged on the head so that the first open ends of the sippers are simultaneously insertable, with movement of the head, into a corresponding number of the sample containers.

2. A system as in claim 1, wherein the sippers are simultaneously insertable into the sample containers without contacting exterior portions of the sample containers.

3. A system as in claim 1, wherein the sample containers are each formed to accommodate a sample volume in the range of 50 milliliters to 1,000 milliliters.

4. A system as in claim 1, wherein the sample containers are formed of materials compatible with samples contained therein.

5. A system as in claim 1, further comprising a pump in selective communication with the outlet tubes to allow for pumping of a rinse solution through the lumens of the sippers.

6. A system as in claim 1, further comprising a first movable mount on the head, a first of the sippers being fixed to the first movable mount, the first movable mount being configured to move relative to the head to adjust the position of the first sipper.

7. A system as in claim 6, wherein a second of the sippers being adjacent to the first sipper, movement of the first movable mount causing the spacing between the first and second sippers to be adjusted.

8. A system as in claim 7, further comprising a second movable mount on the head, the second sipper being fixed to the second movable mount, the second movable mount being configured to move relative to the head to adjust the position of the second sipper.

9. A system as in claim 1, wherein at least one of the sippers terminates with a V-shaped end about the first open end thereof.

10. A system as in claim 1, wherein the deck is formed from a layer of polymeric material.

11. A system as in claim 10, wherein the polymeric material is a polymeric foam.

12. A system as in claim 1, wherein the sippers are simultaneously inserted into a subset of the sample containers.

13. A system as in claim 12, further comprising a first movable mount on the head, a first of the sippers being fixed to the first movable mount, the first movable mount being configured to move relative to the head to adjust the position of the first sipper.

14. A system as in claim 13, wherein a second of the sippers being adjacent to the first sipper, movement of the first movable mount causing the spacing between the first and second sippers to be adjusted.

15. A system as in claim 14, further comprising a second movable mount on the head, the second sipper being fixed to the second movable mount, the second movable mount being configured to move relative to the head to adjust the position of the second sipper.

16. An automated, parallel autosampler system for drawing chromatography samples from a plurality of sample containers, the system comprising:
   a deck;
   an array of compartments defined by the deck, each of the compartments configured to closely receive one of the sample containers in an upright manner to minimize relative movement of the received sample container relative to the deck;
   a head;
   at least one drive selectively controllable to move the deck in three coordinate directions relative to the head;
   a plurality of elongated sippers mounted to the head at spaced-apart locations, each of the sippers having a first open end, a second open end, and a lumen extending between the first and second open ends, wherein, the sippers are arranged on the head such that the first open ends face the deck;
   a plurality of outlet tubes connected to the second open ends of the sippers in one-to-one correspondence; and,
   at least one source of negative pressure in selective communication with the outlet tubes to selectively provide negative pressure in the lumens of the sippers,
   wherein, the sippers are arranged on the head so that the first open ends of the sippers are simultaneously insertable, with movement of the deck, into a corresponding number of the sample containers.

17. A system as in claim 16, wherein the sippers are simultaneously insertable into the corresponding number of the sample containers without contacting exterior portions of the sample containers.

18. A system as in claim 16, wherein the sample containers are each formed to accommodate a sample volume in the range of 50 milliliters to 1,000 milliliters.

19. A system as in claim 16, wherein the sample containers are formed of materials compatible with samples contained therein.

20. A system as in claim 16, further comprising a pump in selective communication with the outlet tubes to allow for pumping of a rinse solution through the lumens of the sippers.

21. A system as in claim 16, wherein at least one of the sippers terminates with a V-shaped end about the first open end thereof.

22. A system as in claim 16, wherein the deck is formed from a layer of polymeric material.

23. A system as in claim 22, wherein the polymeric material is a polymeric foam.

24. A system as in claim 16, wherein the sippers are simultaneously inserted into a subset of the sample containers.

25. An automated, parallel autosampler system for drawing chromatography samples from a plurality of sample containers, the system comprising:
- a deck;
- an array of compartments defined by the deck, each of the compartments configured to closely receive one of the sample containers in an upright manner to minimize relative movement of the received sample container relative to the deck;
- a head;
- at least one first drive selectively controllable to move the deck in at least one coordinate direction relative to the head;
- at least one second drive selectively controllable to move the head in at least one coordinate direction relative to the deck;
- a plurality of elongated sippers mounted to the head at spaced-apart locations, each of the sippers having a first open end, a second open end, and a lumen extending between the first and second open ends, wherein, the sippers are arranged on the head such that the first open ends face the deck;
- a plurality of outlet tubes connected to the second open ends of the sippers in one-to-one correspondence; and,
- at least one source of negative pressure in selective communication with the outlet tubes to selectively provide negative pressure in the lumens of the sippers,
wherein, the sippers are arranged on the head so that the first open ends of the sippers are simultaneously insertable, with movement of at least one of the head and the deck, into a corresponding number of the sample containers.

26. A system as in claim 25, wherein the sippers are simultaneously insertable into the subset of the sample containers without contacting exterior portions of the sample containers.

27. A system as in claim 25, wherein the sample containers are each formed to accommodate a sample volume in the range of 50 milliliters to 1,000 milliliters.

28. A system as in claim 25, wherein the sample containers are formed of materials compatible with samples contained therein.

29. A system as in claim 25, further comprising a pump in selective communication with the outlet tubes to allow for pumping of a rinse solution through the lumens of the sippers.

30. A system as in claim 25, further comprising a first movable mount on the head, a first of the sippers being fixed to the first movable mount, the first movable mount being configured to move relative to the head to adjust the position of the first sipper.

31. A system as in claim 30, wherein a second of the sippers being adjacent to the first sipper, movement of the first movable mount causing the spacing between the first and second sippers to be adjusted.

32. A system as in claim 31, further comprising a second movable mount on the head, the second sipper being fixed to the second movable mount, the second movable mount being configured to move relative to the head to adjust the position of the second sipper.

33. A system as in claim 25, wherein at least one of the sippers terminates with a V-shaped end about the first open end thereof.

34. A system as in claim 25, wherein the deck is formed from a layer of polymeric material.

35. A system as in claim 34, wherein the polymeric material is a polymeric foam.

36. A system as in claim 25, wherein the sippers are simultaneously inserted into a subset of the sample containers.

* * * * *